(12) United States Patent
Zhang et al.

(10) Patent No.: US 8,788,556 B2
(45) Date of Patent: Jul. 22, 2014

(54) MATRIX COMPUTATION FRAMEWORK

(75) Inventors: Zheng Zhang, Beijing (CN); Zhengping Qian, Beijing (CN); Xiuwei Chen, Beijing (CN); Yuan Yu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 13/105,915

(22) Filed: May 12, 2011

(65) Prior Publication Data

US 2012/0290867 A1     Nov. 15, 2012

(51) Int. Cl.
*G06F 17/16*     (2006.01)

(52) U.S. Cl.
USPC ........................................................ 708/400

(58) Field of Classification Search
None
See application file for complete search history.

(56) References Cited

U.S. PATENT DOCUMENTS

| | | | |
|---|---|---|---|
| 5,274,832 A | 12/1993 | Khan | |
| 5,742,821 A * | 4/1998 | Prasanna | 718/102 |
| 5,781,779 A | 7/1998 | Gilbert et al. | |
| 8,527,973 B2 * | 9/2013 | Little et al. | 717/149 |
| 2004/0268334 A1 * | 12/2004 | Muthukumar et al. | 717/160 |
| 2006/0112057 A1 * | 5/2006 | Lai | 706/47 |
| 2007/0165035 A1 * | 7/2007 | Duluk et al. | 345/506 |
| 2010/0223268 A1 * | 9/2010 | Papakonstantinou et al. | 707/749 |
| 2012/0230267 A1 * | 9/2012 | Sundaresan et al. | 370/329 |
| 2012/0290867 A1 * | 11/2012 | Zhang et al. | 714/1 |
| 2013/0031331 A1 * | 1/2013 | Cheriton et al. | 711/206 |

OTHER PUBLICATIONS

Krommer, Arnold., "Parallel Sparse Matrix Computations Using the PINEAPL Library: A Performance Study", Retrieved at << http://www.nag.co.uk/doc/TechRep/PDF/tr1_98.pdf>>, Parallel Processing, 4th International Euro-Par Conference, Sep. 1-4, 1998, pp. 1-12.

Ranaweera, et al., "Scheduling of Periodic Time Critical Applications for Pipelined Execution on Heterogeneous systems", Retrieved at << http://ieeexplore.ieee.org/stamp/stamp.jsp?tp=&arnumber=952055 >>, International Conference on Parallel Processing, Sep. 3-7, 2001, pp. 131-138.

Huang, et al., "Algorithm-Based Fault Tolerance for Matrix Operations", Retrieved at << http://ieeexplore.ieee.org/stamp/stamp.jsp?tp=&arnumber=1676475 >>, IEEE Transactions on Computers, vol. c-33, No. 6, Jun. 1984, pp. 518-528.

Fu, et al., "Integrating Software Pipelining and Graph Scheduling for Iterative Scientific Computations", Retrieved at <<http://citeseerx.ist.psu.edu/viewdoc/download?doi=10.1.1.50.5912&rep=rep1&type=pdf >>, Parallel Algorithms for Irregularly Structured Problems, Second International Workshop, IRREGULAR, Sep. 4-6, 1995, pp. 15.

(Continued)

*Primary Examiner* — David H Malzahn
(74) *Attorney, Agent, or Firm* — Carole Boelitz; Micky Minhas

(57) ABSTRACT

Described herein are technologies pertaining to matrix computation. A computer-executable algorithm that is configured to execute perform a sequence of computations over a matrix tile is received and translated into a global directed acyclic graph that includes vertices that perform a sequence of matrix computations and edges that represent data dependencies amongst vertices. A vertex in the global directed acyclic graph is represented by a local directed acyclic graph that includes vertices that perform a sequence of matrix computations at the block level, thereby facilitating pipelined, data-driven matrix computation.

20 Claims, 7 Drawing Sheets

(56) References Cited

OTHER PUBLICATIONS

Datta, Biswa Nath., "Recent Developments in Largescale and Parallel Matrix Computations and their Applications to Linear Control Problems", Retrieved at << http://ieeexplore.ieee.org/stamp/stamp.jsp?tp=&arnumber=410887 >>, Proceedings of the 33rd conference on decision and control, Dec. 14-16, 1994, pp. 438-442.

Chen, et al., "Algorithm Based Checkpoint Free Fault Tolerance for Parallel Matrix Computations on Volatile Resources", Retrieved at << http://ieeexplore.ieee.org/stamp/stamp.jsp?tp=&arnumber=1639333 >>, Proceedings of the 20th IEEE International Parallel & Distributed Processing Symposium (IPDPS), Apr. 25-29, 2006, pp. 1-10.

Bikshandi, et al., "Programming for Parallelism and Locality with Hierarchically Tiled Arrays", Retrieved at << http://polaris.cs.uiuc.edu/~garzaran/doc/ppopp06.pdf >>, ACM SIGPLAN Symposium on Principles and Practice of Parallel Programming (co-located with CGO), Mar. 29-31, 2006, pp. 1-10.

Zhan, et al., "Fault Diagnosis Based on Granular Matrix-SDG and its Application", Retrieved at << http://ieeexplore.ieee.org/stamp/stamp.jsp?tp=&arnumber=5255021 >>, IEEE International Conference on Granular Computing, GrC, Aug. 17-19, 2009, pp. 1-5.

Lamport, Leslie., "Specifying systems: The TLA+ language and tools for hardware and software engineers", Retrieved at << http://research.microsoft.com/en-us/um/people/lamport/tla/book-02-08-08.pdf >>, Jun. 18, 2002, pp. 1-382.

Choi, et al., "Sca-LAPCK: A Scalable Linear Algebra Library for Distributed Memory Concurrent Computers", Retrieved at << http://ieeexplore.ieee.org/stamp/stamp.jsp?arnumber=00234898 >>, Fourth Symposium on the Frontiers of Massively Parallel Computation, Oct. 19-21, 1992, pp. 120-127.

Agullo, et al., "Numerical Linear Algebra on Emerging Architectures: The PLASMA and MAGMA Projects", Retrieved at << http://iopscience.iop.org/1742-6596/180/1/012037/pdf/1742-6596_180_1_012037.pdf >>, 2009, pp. 1-6.

Gunnels, et al., "FLAME: Formal Linear Algebra Methods Environment", Retrieved at << http://www.cparity.com/projects/AcmClassification/samples/504213.pdf >>, ACM Transactions on Mathematical Software, vol. 27, No. 4, Dec. 2001, pp. 422-455.

Bosilca, et al., "Distibuted Dense Numerical Linear Algebra Algorithms on Massively Parallel Architectures: DPLASMA", Retrieved at << http://www.netlib.org/lapack/lawnspdf/lawn232.pdf >>, Technical Report, UT-CS-10-660, Sep. 15, 2010, pp. 1-10.

Bosilca, et al., "DAGuE: A Generic Distributed DAG Engine for High Performance Computing", Retrieved at << http://www.netlib.org/lapack/lawnspdf/lawn231.pdf >>, Technical Report, ICL-UT-10-01, Apr. 11, 2010, pp. 1-11.

Liu, et al., "Distributed Nonnegative Matrix Factorization for Web-scale Dyadic Data Analysis on Mapreduce", Retrieved at << http://research.microsoft.com/pubs/119077/DNMF.pdf >>, The 19th International World Wide Web Conference, Apr. 26-30, 2010, pp. 1-10.

Seo, et al., "HAMA: An Efficient Matrix Computation with the MapReduce Framework", Retrieved at << http://csl.skku.edu/papers/CS-TR-2010-330.pdf >>, Cloud Computing, Second International Conference, CloudCom, Nov. 30- Dec. 3, 2010, pp. 1-7.

Isard, et al., "Dryad: Distributed Data-parallel Programs from Sequential Building Blocks", Retrieved at << http://research.microsoft.com/pubs/63785/eurosys07.pdf >>, Eurosys Conference, Mar. 21-23, 2007, pp. 1-14.

Yu, et al., "DryadLINQ: A System for General-purpose Distributed Data-parallel Computing using a High-level Language", Retrieved at << http://research.microsoft.com/en-us/projects/DryadLINQ/DryadLINQ.pdf >>, 2008, pp. 1-14.

Watt, Stephen M., "Pivot-free Block Matrix Inversion", Retrieved at << http://ieeexplore.ieee.org/stamp/stamp.jsp?tp=&arnumber=4090311 >>, In Proceedings 8th International Symposium on Symbolic and Numeric Algorithms for Scientific Computing, (SYNASC), 2006, pp. 1-5.

\* cited by examiner

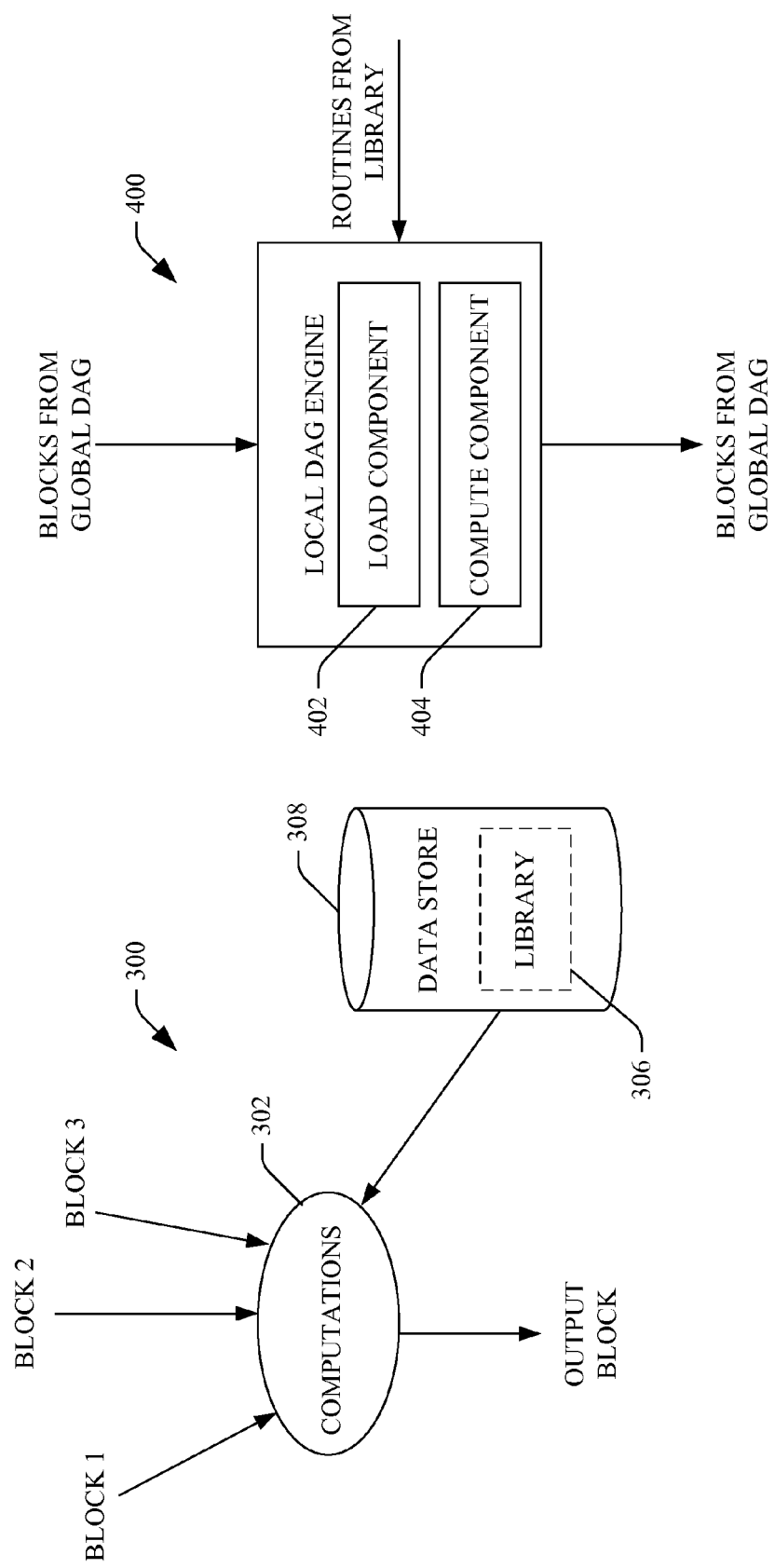

MATRIX COMPUTATION FRAMEWORK

BACKGROUND

The term "high-performance computing" generally refers to the utilization of clusters of computers to solve advanced computation problems. The term is most commonly associated with computing undertaken in connection with scientific research or computational science. Exemplary applications that can be classified as high-performance computing applications include, but are not limited to, visual computing, including robust facial recognition and robust 3-D modeling with crowd-sourced photos, research undertaken with respect to web mining, machine learning, and the like.

A conventional approach for performing parallel computation of data in connection with high-performance computing is the single instruction multiple data (SIMD) approach. This approach describes the utilization of computers with multiple processing elements that perform the same operation on multiple different data simultaneously, thereby exploiting data level parallelism. Machines configured to perform SIMD generally undertake staged processing such that a bottleneck is created during synchronization of data. Specifically, another machine or computing element may depend upon output of a separate machine or computing element, and various dependencies may exist. In SIMD, a computing element waits until all data that is depended upon is received and then undertakes processing thereon. This creates a significant scalability bottleneck.

Large-scale data intensive computation has recently attracted a tremendous amount of attention, both in the research community and in industry. Moreover, many algorithms utilized in high-performance computing applications can be expressed as matrix computation. Conventional mechanisms for coding kernels utilized in connection with matrix computation, as well as designing applications that utilize matrix computations, are relatively low level. Specifically, writing new computation kernels that facilitate matrix computation requires a deep understanding of interfaces that allow processes to communicate with one another by sending and receiving messages, such as the message passing interface (MPI). This makes it quite difficult for scientists to program algorithms that facilitate matrix computation.

SUMMARY

The following is a brief summary of subject matter that is described in greater detail herein. This summary is not intended to be limiting as to the scope of the claims.

Described herein are various technologies pertaining to pipelined matrix computation. With more particularity, matrix computations can be expressed as a sequence of operations that are performed on tiles of the matrix, wherein a matrix tile is a portion of the matrix. As will be understood by one skilled in the art of matrix computation, matrices can be relatively large such that a tile of the matrix may be in the order of several tens of thousands of elements. In an example, these operations that are to be executed on tiles at execution time can be translated into directed acyclic graphs (DAGs). A DAG that represents a sequence of operations that are to be performed on a particular matrix tile can be referred to herein as a global DAG. The global DAG comprises a plurality of vertices and corresponding edges, where a vertex in the global DAG performs a sequence of operations on the tile and edges represent data dependencies among vertices. Pursuant to an example, each vertex in a global DAG can be assigned to a particular computing element, wherein a computing element may be a processor, a computer, or a collection of processors.

As mentioned above, a vertex in the global DAG is configured to perform a plurality of computing operations on the matrix tile. As described herein, such vertex can be further represented by a local DAG. The local DAG also comprises a plurality of vertices that are configured to perform a sequence of mathematical (matrix) computations at a matrix block level, where a matrix block is significantly smaller than a matrix tile. For instance, a size of a block can be on the order of a size of a cache of a computing device that is configured to perform mathematical computations at the block level. In contrast, a matrix tile is typically of the order of main memory size. The local DAG additionally comprises a plurality of edges that couple vertices in the local DAG to represent data dependencies amongst vertices. In this approach, the local DAG may be configured to output blocks that can be consumed by other vertices in the global DAG. Accordingly, the system operates in a data-driven manner such that data producers produce output blocks as soon as requisite input blocks are received, such that computation can be pushed through the system as far as possible at the matrix block level.

As can be ascertained, the above describes a pipelined approach for performing complex matrix computations, such that blocks can be pushed through the local DAG and the global DAG as far as possible. In large-scale computing systems, however, faults may occur. For instance, network issues may cause a particular computing device to go off-line. Maintenance may cause a particular computing device to be down for some period of time, etc. One mechanism for fault tolerance is to simply restart all computations from the top of the global DAG. However, this is time consuming and suboptimal. Described herein is an approach for fault tolerance in a matrix computation system that performs matrix computations on matrix blocks and outputs matrix blocks in a data-driven manner. This fault tolerance is based at least in part upon monitoring which blocks are needed by child vertices in the local DAG and/or the global DAG to perform matrix computations.

Other aspects will be appreciated upon reading and understanding the attached figures and description.

BRIEF DESCRIPTION OF THE DRAWINGS

FIG. 3 illustrates a particular vertex in a directed acyclic graph that performs a computation based upon received matrix blocks.

FIG. 4 is a functional block diagram of an engine that facilitates performing matrix computation.

DETAILED DESCRIPTION

Figure 1:
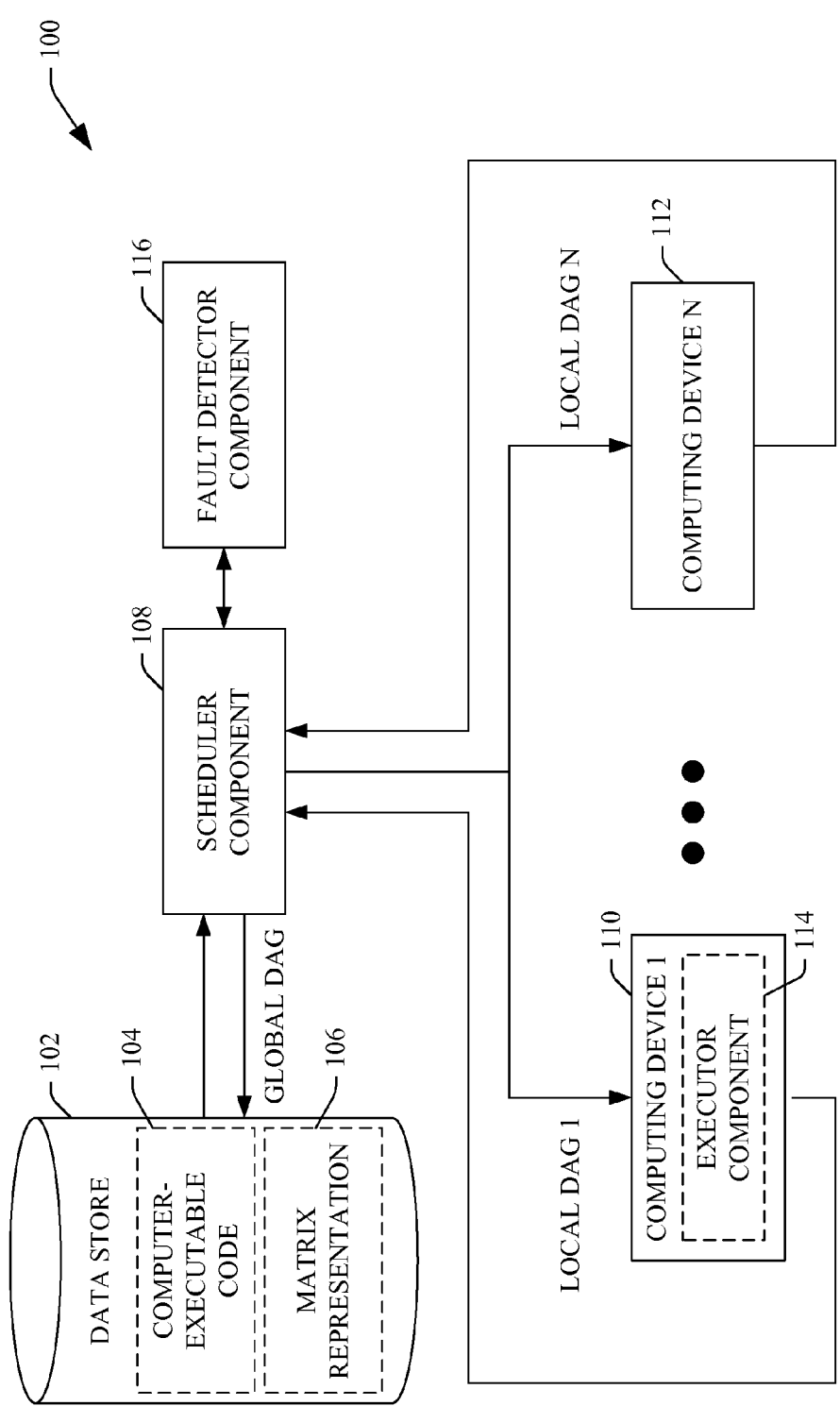
FIG. 1 is a functional block diagram of an exemplary system that facilitates pipelined matrix computation.

Various technologies pertaining to matrix computation in a data-driven manner will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference now to FIG. 1, an exemplary system 100 that facilitates pipelined matrix computation in a high-performance computing environment is illustrated. Prior to describing components of the system, a unified programming model will be described herein that facilitates exposing a unified programming model to both matrix kernel developers and application developers that rely on matrix computations. At the application level, a unified programming model described herein provides a scalable matrix computation library that can support both basic matrix operations, such as multiplication, as well as higher-level computations such as Cholesky and LU factorization. For example, such library can be integrated into a software framework that supports several programming languages, which allows language interoperability. Accordingly, this library can be accessed and utilized by applications and/or kernels written in a variety of different programming languages such that a scientific researcher and/or computer programmer can readily program applications and matrix computation kernels utilizing such framework. The library that supports the matrix operations described above can be invoked directly utilizing one of the languages supported by the aforementioned software framework as method calls to perform large-scale matrix computations. Accordingly, for instance, programs may be generated to perform many data intensive computations that include matrix application kernels.

The unified programming model can adopt the widely used tile abstraction for writing matrix computation kernels. In such an abstraction, a matrix is divided into a plurality of tiles (square cell matrices), and matrix computations are expressed as a sequence of operations on tiles. Shown below, an exemplary tile algorithm that solves matrix inversion is displayed in matrix format and in code supported by the unified programming model. As shown, programming a tile algorithm in such programming model is fairly straightforward and is a direct translation of the algorithm into a sequential program. Parallelization and distributed execution of such program will be described below. Inversion of a 2×2 matrix over coefficient ring R can be expressed as follows:

$$M = \begin{bmatrix} A & B \\ C & D \end{bmatrix}, M^{-1} = \begin{bmatrix} (A - BD^{-1}C)^{-1} & (C - DB^{-1}A)^{-1} \\ (B - AC^{-1}D)^{-1} & (D - CA^{-1}B)^{-1} \end{bmatrix}$$

To avoid inverting all of A, B, C, D, only A can be required to be invertible, as shown here:

$$M^{-1} = \begin{bmatrix} I & -A^{-1}B \\ 0 & I \end{bmatrix} \begin{bmatrix} A^{-1} & 0 \\ 0 & S_A^{-1} \end{bmatrix} \begin{bmatrix} I & 0 \\ -CA^{-1} & I \end{bmatrix}$$

-continued $$= \begin{bmatrix} A^{-1} + A^{-1}BS_A^{-1}CA^{-1} & -A^{-1}BS_A^{-1} \\ -S_A^{-1}CA^{-1} & S_A^{-1} \end{bmatrix}$$

where $S_A = D - CA^{-1}B$ is the Schur complement of A in M Alternatively, $M^{-1}$ can be expressed as follows:

$$M^{-1} = \begin{bmatrix} S_D^{-1} & -S_D^{-1}BD^{-1} \\ -D^{-1}CS_D^{-1} & D^{-1} + D^{-1}CS_D^{-1}BD^{-1} \end{bmatrix}$$

An exemplary program that can be utilized to perform this matrix computation is as follows:

```
public ParallelMatrix Inverse( )
{
    var M = Partition(this, 2, 2);
    var A = M[0, 0];
    var B = M[0, 1];
    var C = M[1, 0];
    var D = M[1, 1];
    var Ai = A.Inverse( );
    var CAi = C * Ai;
    var Si = (D – CAi * B).Inverse( );
    var AiBSi = Ai * B * Si;
    var result = new ParallelMatrix[2, 2];
    result[0, 0] = Ai + AiBSi * CAi;
    result[0, 1] = AiBSi.Neg( );
    result[1, 0] = (Si * CAi).Neg( );
    result[1, 1] = Si;
    return ParallelMatrix.Combine(result);
}
```

As will be described below, tile algorithms can be automatically translated into directed acyclic graphs (DAGs) at execution time, wherein a DAG includes a plurality of vertices and edges. A vertex in a directed acyclic graph is configured to perform a sequence of mathematical operations on tiles and edges in the DAG capture data dependencies among vertices.

The system 100 comprises a data store 102, which may be a hard drive, memory or other suitable storage media. The data store 102 comprises computer-executable code 104, which may be, for example, a tile algorithm such as the tile algorithm presented above. It is to be understood that numerous tile algorithms have been generated for performing matrix computation. A data store 102 further comprises a matrix representation 106. Pursuant to an example, the matrix representation 106 may be symbolic or may include numerical values. Oftentimes such matrix representation 106 can be quite large—on the order of tens of thousands or hundreds of thousands of entries.

A scheduler component 108 can receive the computer-executable code 104 and the matrix representation 106, wherein the computer executable code 104 is configured to perform one or more computations over at least portions of the matrix represented by the matrix representation 106. The scheduler component 108 may then cause the computer-executable code 104 to be represented as a global DAG that includes a plurality of vertices and a plurality of edges. Vertices in the global DAG are configured to perform a sequence of operations on tiles of the matrix, wherein a tile is a square subportion of such matrix. As used herein, a matrix tile may be relatively large, such as on the order of size of main memory in a computing device that is configured to perform matrix computations over the matrix tile. Edges between vertices in the global DAG represent data dependencies between vertices. Therefore, for example, a first vertex that is coupled to a second vertex by an edge indicates that the second vertex is dependent upon output of the first vertex. Pursuant to an example, the scheduler component 108 can translate the computer-executable code 104 into the global DAG at execution time of the computer-executable code 104. Furthermore, the scheduler component 108 can cause the global DAG to be retained in the data store 102 or other suitable data store that is accessible to the scheduler component 108. As will be described in greater detail below, a scheduler component is also configured to cause the vertices in the global DAG to be scheduled such that these vertices can be executed on computing devices in a distributed computing platform.

It is to be understood that translating the computer-executable code 104 into the global DAG ensures that synchronization of vertex computation is strictly the result of data dependencies between vertices. As mentioned previously, the global DAGs operate at the level of a matrix tile and can be directly executed through utilization of a general purpose distributed DAG execution engine. Conventional general purpose DAG execution engines, however, do not allow computation of depending vertices to overlap, thereby creating a performance bottleneck for distributed matrix computation. Accordingly, the system 100 facilitates pipelined DAG execution to explore inter-vertex parallelism. Thus, the global DAG can be executed in a data-driven manner. This can be accomplished, for example, by further translating individual vertices in the global DAG into more granular DAGs that carry out computations at matrix block levels. As used herein, a matrix block is significantly smaller than a matrix tile, such as, for example, on the order of size of a cache of a computing device that is configured to perform matrix computations. Therefore, while size of a matrix tile is on the order of size of main memory, size of a matrix block is on the order of size of the cache.

With more particularity, for a vertex in the global DAG, the scheduler component 108 can translate such vertex into a local DAG. The local DAG can comprise a plurality of vertices and corresponding edges, wherein vertices in the local DAG carry out the actual matrix computation by calling into an existing math library. Again, this computation is undertaken at the block level and can be performed in a data-driven manner. Edges in the local DAG represent data dependencies amongst vertices in the local DAG.

The system 100 may further comprise a plurality of computing devices 110-112 that are configured to perform matrix computations. Pursuant to an example, these computing devices 110-112 may be standalone computing devices that are in communication with a computing device that comprises the scheduler component 108 by way of a network connection. Therefore, for example, the scheduler component 108 may be comprised by a parent computing device that is configured to schedule computation amongst the plurality of computing devices 110-112. Additionally, as will be described below, the scheduler component 108 can facilitate fault tolerance with respect to failures of one or more of the computing devices 110-112.

In an example, the first computing device 110 can comprise an executor component 114 that is configured to execute vertices in the local DAG. More specifically, if the local DAG depends upon data from another local DAG, such data can be provided to the computing device 110 in the form of matrix blocks. As such blocks are received, computation that is based upon these blocks can be pushed through the local DAG as far as possible. Therefore, the executor component 114 facilitates executing the local DAG in a data-driven manner, in parallel with other vertex operations in the local DAG as well as in parallel with computations undertaken by other computing scheduled to perform matrix computations by the scheduler component 108.

It can be ascertained that performing matrix computations in such a highly parallel pipelined manner can cause fault tolerance to become relatively complex due to several data dependencies. Accordingly, the system 100 may comprise a fault detector component 116 that can detect that a fault has occurred in a computation at one or more of the computing devices 110-112. Such faults may exist, for instance, due to network failures, maintenance, hardware failures, etc. at the computing devices 110-112. In an exemplary approach, the fault detector component 116 can detect a fault at one of the computing devices 110-112 and can inform the scheduler component 108 of such fault. At such point in time, the scheduler component 108 can identify the vertex in the global DAG that is being executed at the computing device where the failure occurred, and can cause such vertex to be restarted. For instance, the scheduler component 108 can reschedule the local DAG that is a translation of the vertex in the global DAG at a different computing device that has not failed. Due to the various types of data dependencies, however, this approach of restarting a vertex may be inefficient.

Accordingly, as will be described in greater detail herein, the computing devices 110-112 can be configured to provide the scheduler component 108 with data that is indicative of blocks that have been consumed by vertices in the local DAG, blocks that have been output by vertices in the local DAG, and blocks that are needed by vertices in the local DAG to perform a computation. Thereafter, vertices in the local DAG at the computing device where the fault occurred can be selectively determined for re-starting (or rescheduled at another computing device). Additional detail pertaining to selectively determining which vertices in a local DAG to restart will be provided below.

Figure 2:
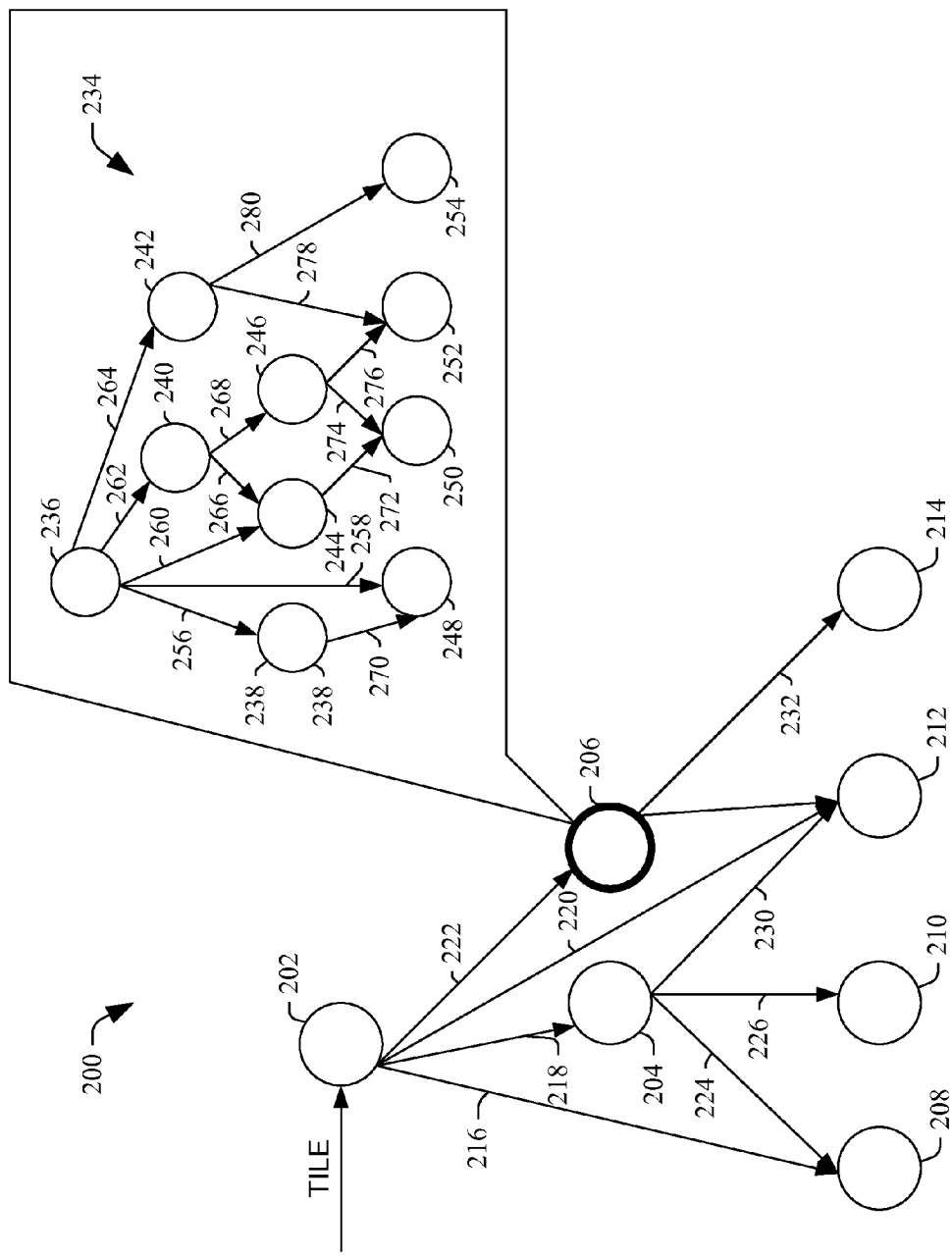
FIG. 2 illustrates an exemplary global directed acyclic graph and a corresponding local directed acyclic graph.

With reference now to FIG. 2, an exemplary global DAG 200 that can be created by the scheduler component 108 is illustrated. As mentioned above, the exemplary global DAG 200 may comprise a plurality of vertices 202-214. In this exemplary data structure, each vertex in the global DAG 200 is configured to perform a sequence of matrix computations at a matrix tile level. The global DAG 200 further comprises a plurality of edges 216-232. These edges represent data dependencies amongst vertices. More specifically, the edge 218 indicates that the vertex 204 is unable to perform desired computations until the vertex 202 outputs results of a matrix computation over a matrix tile. Similarly, the vertex 208, as evidenced by the edge 224 and the edge 216, can perform its sequence of operations only after the vertex 202 and the vertex 204 have completed their respective computations. It can be readily ascertained, however, that the global DAG 200 facilitates parallel computation as, for example, the vertex 204 and the vertex 206 can execute their respective sequential instructions immediately subsequent to receiving computations from the vertex 202.

As mentioned above, vertices in the global DAG 200 can be represented as local DAGs. For instance, the vertex 206 can be represented as a local DAG 234. The local DAG 234 comprises a plurality of vertices 236-254 that are configured to perform matrix computations at the block level. Accordingly, as blocks are received from a parent vertex in the global DAG 200, the respective computations can be pushed at the block level as far as possible through the local DAG 234. In other words, a vertex can perform a computation at the block level and output a resulting block for provision to a child vertex immediately subsequent to performing the computation. This results in increased inter-vertex parallel computing, wherein the vertices in the global DAG 200 and the local DAG 234 execute in a data-driven manner rather than in a staged manner.

The local DAG 234 further comprises a plurality of edges 256-280. Again, these edges can represent data dependencies between vertices in the local DAG 234. As mentioned previously, while the local DAG 234 is shown for purposes of explanation, it is to be understood that the local DAG 234 can be represented by a DAG-free skeleton code to reduce overhead that may be caused by multiple vertices and interdependencies.

Referring now to FIG. 3, an exemplary depiction 300 of a vertex 302 that may be included in a local DAG is illustrated. The vertex 302 is configured to perform a series of matrix computations at the block level. Pursuant to an example, the vertex 302 may receive output blocks from a plurality of other vertices in the local DAG, wherein the computations in the vertex 302 depend upon such blocks. Accordingly, immediately responsive to the vertex 302 receiving a first block, a second block and a third block, the vertex 302 can be configured to generate an output block. With more particularity, the vertex 302 can carry out actual matrix computation by calling into an existing math library 306 that is in a data store 308 that is accessible to the vertex 302. Numerous math libraries that include a rich set of operators from basic matrix operators to high-level solvers currently exist, and can be utilized in connection with the systems and methods described herein.

Now referring to FIG. 4, an exemplary depiction of a local DAG execution engine 400 is illustrated. The local DAG execution engine 400 can be seen from the perspective of the global DAG as a black box. The local DAG execution engine 400 can be driven by two simple state machines. These state machines are represented by a load component 402 and a compute component 404. The load component 402 is configured to load blocks from parent vertices in the global DAG. The arriving blocks from the global DAG can be new to the local DAG execution engine 400 or may be blocks previously seen. The latter can occur if recomputation is triggered under some failure sequences.

The compute component 404 is configured to scan available local blocks (from the global DAG or vertices in the local DAG) and push computation through the local DAG as far as possible in the local DAG. The compute component 404 can call appropriate routines from the math library 306 described above for any vertices that are ready to perform computations on output blocks. This causes potential production of blocks for downstream vertices in the global DAG.

The computing framework of the local DAG execution engine 400 resembles a data-driven machine. Therefore, the local DAG execution engine 400 can match and fire while walking the local DAG. This is relatively straightforward if the local DAG is small. The local DAG, however, may be rather large. For instance, in a Cholesky decomposition of a large matrix, where each tile is made up of 256×256 blocks, the local DAG can have approximately 8.5 million vertices. Storing and manipulating such a large graph can impose non-trivial memory and CPU overhead.

Accordingly, a DAG-free representation of the local DAG can be implemented to avoid much of such overhead. The scheduler component 108 can automatically transform original sequential code into a skeleton code in which no operations are actually carried out. As new blocks arrive from the global DAG or more generally, whenever computation is required, the skeleton code can be executed to fire computation for operators whose operands are available. In other words, the skeleton code can cause an operator to fire responsive to receipt of a block from a parent vertex in the global DAG. Partial results (e.g., outputs of vertices of the local DAG) can be stored by the local DAG execution engine 400 and fetched at an appropriate time.

Figure 5:
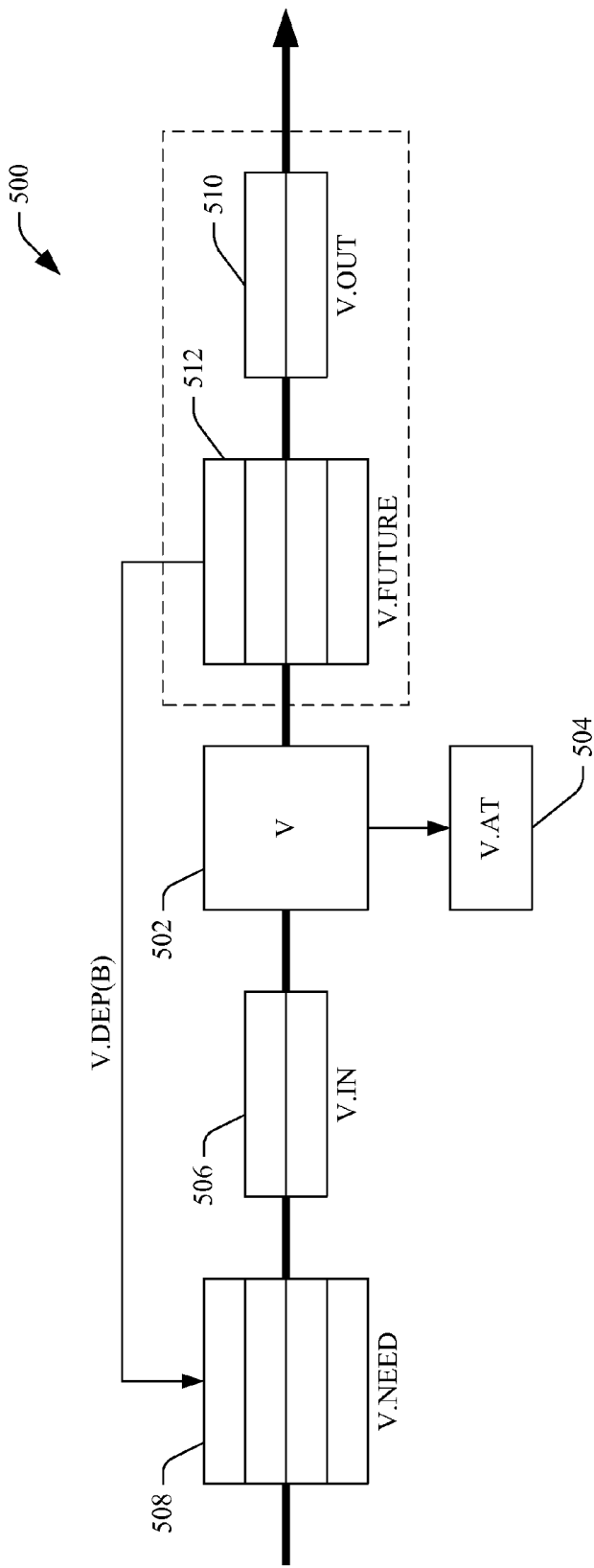
FIG. 5 is an exemplary depiction of data that is monitored in connection with performing fault tolerance in a matrix computation system.

With reference now to FIG. 5, a state diagram 500 is illustrated that describes a vertex for pipelined execution and failure handling. The pipelined DAG execution model described above yields substantial performance gain compared to a staged DAG execution model. Handling fault tolerance, however, becomes more challenging. To achieve non-blocking pipelined execution, partial results (blocks) of the vertex computation are observed and consumed by its descendents, potentially without bounds. It can further be noted that an arbitrary number of vertices at arbitrary positions in the global DAG may be hosted on one machine, and therefore a single machine can break multiple holes in a local DAG that is being executed.

As mentioned above, a possible mechanism for dealing with failure of a vertex is to restart that vertex since all computation is deterministic. For a failed vertex, however, several of the re-computed blocks may not be needed. Additionally, the overhead of (unwanted) redundant computing is not restricted to the restarted vertex. A redundant reproduced block can trigger unnecessary computing in a depending vertex and so on and so forth, in a cascading fashion. Therefore, without careful bookkeeping, overhead utilized for fault handling may be nontrivial.

Determining a particular set of blocks that are needed to be tracked, at first glance appears difficult. For instance, a vertex v may have a child vertex w. A block b that w has received and stored in its input buffer is not needed anymore from v's perspective. Thus, in other words, if v suffers a failure and recovers it need not reproduce b. b is not needed either if w has consumed b for any blocks that depend on b, and so forth. Yet there may be complicated sequences of failures that leads w to need b again, and if v itself has lost b, then v needs to recompute b.

Amid such seemingly intricate patterns, a set of simple and straightforward invariants exists. Specifically, two invariants which govern intra- and inter-vertex data dependencies exist. If such two invariants are enforced across all vertices, and the related dependency states are recorded and restored upon recovery (which is different than the data itself), then regardless of a number of vertices that are restarted and their respective topology positions in the DAG, the protocol described herein guarantees that only necessary blocks are recomputed.

There are but a few states that need to be kept for the aforementioned protocol to operate properly. Specifically, as shown, a vertex V 502 can maintain a first list 504 v.all that indicates a list of all blocks the vertex V can compute in its lifetime. A second list 506 identifies blocks that have been received from parent vertices (v.in), and a third list 508 identifies blocks that are still to be received from parent vertices (v.need) to product output blocks. A fourth list 510 identifies blocks that have been output by the vertex V 502 (v.out), and a fifth list 512 identifies blocks that are to be output by the vertex V in the future (v.future).

The first of the two aforementioned two invariants binds the relationship of buffers inside the vertex V 502. As mentioned above, what the vertex needs (v.need) is anything that it needs to produce new blocks, minus what it already has in its input buffer. v.in specifies the blocks that are available in V's input buffer. What the vertex V needs is anything that it needs to produce new blocks minus what it already has in its input buffer:

$$v.need \triangleq v.dep(v.future) - v.in \quad (1)$$

v.dep is a function that, given the identity of an output block b, returns the indices of the set of input blocks that b depends upon. For matrix computation, v.dep can be typically discovered symbolically. For instance, for a 4×4 matrix multiplication, C [0, 0] depends on A[0, 0:3] (A's first row) and B[0:3, 0] (B's first column).

The second invariant complements the first and binds the relationship of outwards facing buffers across neighbors. Specifically, the second invariance specifies what v.future really is. In this invariant, v.out is a set of blocks the vertex V 502 has computed and is available to the rest of the system. As described above, v.all is all the blocks that the vertex is to compute in its lifetime.

$$v.future \triangleq v.children.need \cap v.all - v.out \quad (2)$$

The invariant states that what a vertex needs to produce is the union of everything to satisfy its children intercepts with what this vertex is responsible for (as a child vertex may depend on other vertices), but minus what it has already made available to the children.

The following invariant combines both the aforementioned invariants, and explains the intuition of why enforcing these invariants is sufficient to guarantee full recovery without introducing unnecessary redundant computation:

$$v.need \triangleq v.dep(v.children.need \cap v.all - v.out) - v.in \quad (3)$$

In the absence of failure, the system functions as a pipeline. Initially all vertices have their "future" set as equal to their corresponding "all." In other words, the vertex needs to produce all blocks. Then for a vertex that has data to consume (v.need∩v.parents.out is not in NULL), it is scheduled to an individual machine if there is one. A vertex relinquishes the machine if it is either finished computing (e.g., v.future is NULL) or it is starving for data. The load component 402 moves blocked from parent of vertices or input file (for first level vertices) to v.in, and the compute component 404 fills v.out (described above). Both actions modify other data structures (v.need, v.future) accordingly.

The scheduler component 108 can record the progress and whereabouts of the outputs (the union of v.out of all vertices) so the newly scheduled vertices can know where to fetch data. This metadata can be stored in a reliable data repository. Accordingly, when failure occurs, in addition to knowing identities of vertices have crashed, it can also be ascertained what data has been lost. Conceptually then, to determine what blocks are needed for a recovering vertex, child vertices can be queried for their need set (v.need) (the identities of blocks in v.need), which is sufficient to compute v.need for the parent vertex. If the children vertices happened to have crashed also, the recovery will eventually set their "need" sets appropriately and that in turn will update the parent vertex's "future" and "need)" set, ensuring that the system converges to the invariance.

The same principle can be upheld to handle even more complicated cases. For instance, retired vertices (e.g., those who have computed all outputs) are said to be hibernating at the scheduler component 108 and in that sense they never truly retire. Should any of the children vertices of a retired vertex request blocks that are missing from the system due to failure, the retired vertex is reactivated since their "future" set is no longer empty.

Figure 6:
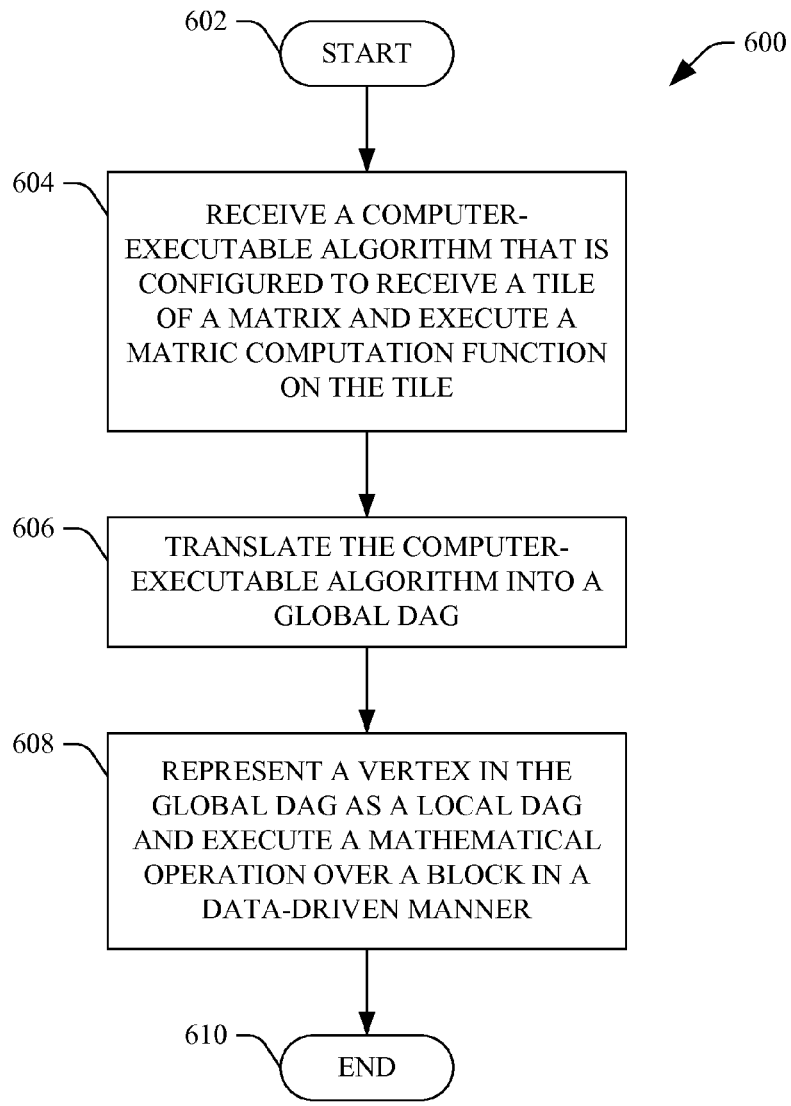
FIG. 6 is a flow diagram that illustrates an exemplary methodology for representing a vertex in a global directed acyclic graph as a local directed acyclic graph.
Figure 7:
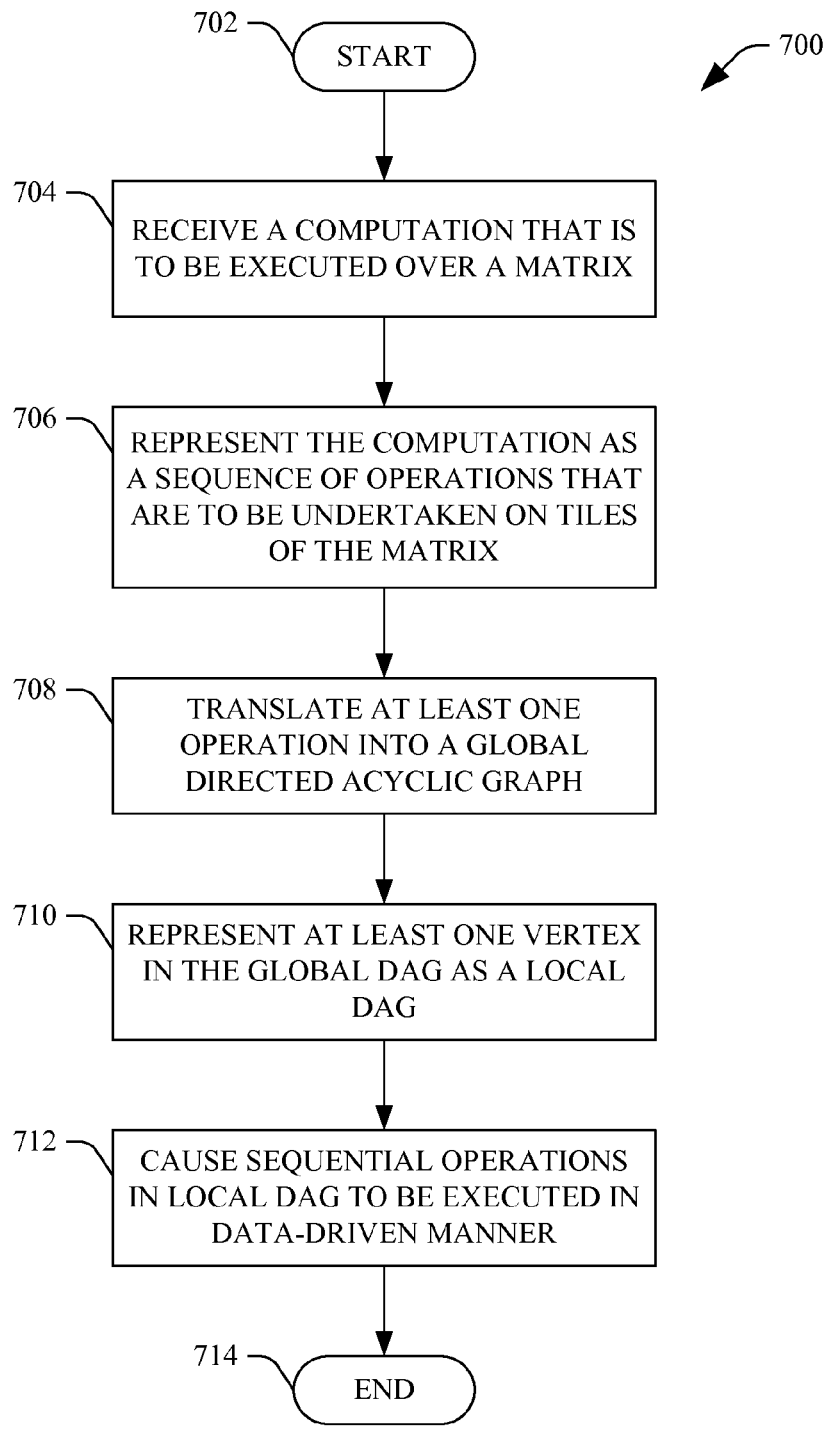
FIG. 7 is a flow diagram illustrates an exemplary methodology for causing sequential operations to be executed in a local directed acyclic graph in a data-driven manner.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may any suitable data storage medium, such as memory, hard drive, CD, DVD, flash drive, or the like. A "computer-readable medium", as the term is used herein, is not intended to encompass a propagated signal.

Turning now to FIG. 6, an exemplary methodology 600 that facilitates representing a vertex in a global DAG as a local DAG and executing a mathematical operation over a matrix block in a data-driven manner is illustrated. The methodology 600 starts at 602, and at 604, a computer-executable algorithm is received that is configured to execute a matrix computation over a tile of a matrix.

At 606, the computer-executable algorithm is translated into a computer-implemented global DAG, wherein the global DAG comprises a plurality of vertices and a corresponding plurality of edges. A vertex in the plurality of vertices is configured to perform a sequence of operations on the tile of the matrix and the plurality of edges represent data dependencies between coupled vertices.

At 608, the vertex in the global DAG is represented as a DAG-free local DAG that comprises a plurality of vertices, wherein a vertex in the local DAG is configured to execute a mathematical operation on a block of a matrix, wherein the block is smaller than the tile. The vertex in the local DAG is configured to execute the mathematical operation in a data-driven manner.

Turning now to FIG. 7, another exemplary methodology 700 that facilitates executing vertices in a local DAG in a data-driven manner is illustrated. The methodology 700 starts at 702, and at 704 at least one computation that is to be executed over a matrix is received. This computation, for instance, may be a tile algorithm that is configured to perform matrix operations over at least a tile of the matrix.

At 706, subsequent to receiving at least one computation, the at least one computation is represented as a sequence of operations that are to be undertaken on tiles of the matrix.

At 708, subsequent to representing at least one computation as a sequence of operations, at least one operation is translated into a global directed acyclic graph that comprises a plurality of vertices that are configured to perform a corresponding plurality of sequential operations on at least one tile of the matrix. The global directed acyclic graph also includes a plurality of edges that represent data dependencies between the plurality of vertices.

At 710, subsequent to the translating of the at least one operation in the global directed acyclic graph, at least one vertex in the global directed acyclic graph is represented as a local directed acyclic graph that comprises a plurality of vertices that are configured to perform a corresponding plurality of sequential operations on at least one block that corresponds to the matrix, wherein a size of the block is smaller than a size of the at least one tile.

At 712, the sequential operations that are represented by the plurality of vertices in a local directed acyclic graph are caused to be executed in a data-driven manner that supports parallelism and improves performance with respect to high-performance computing. The methodology 700 completes at 714.

Figure 8:
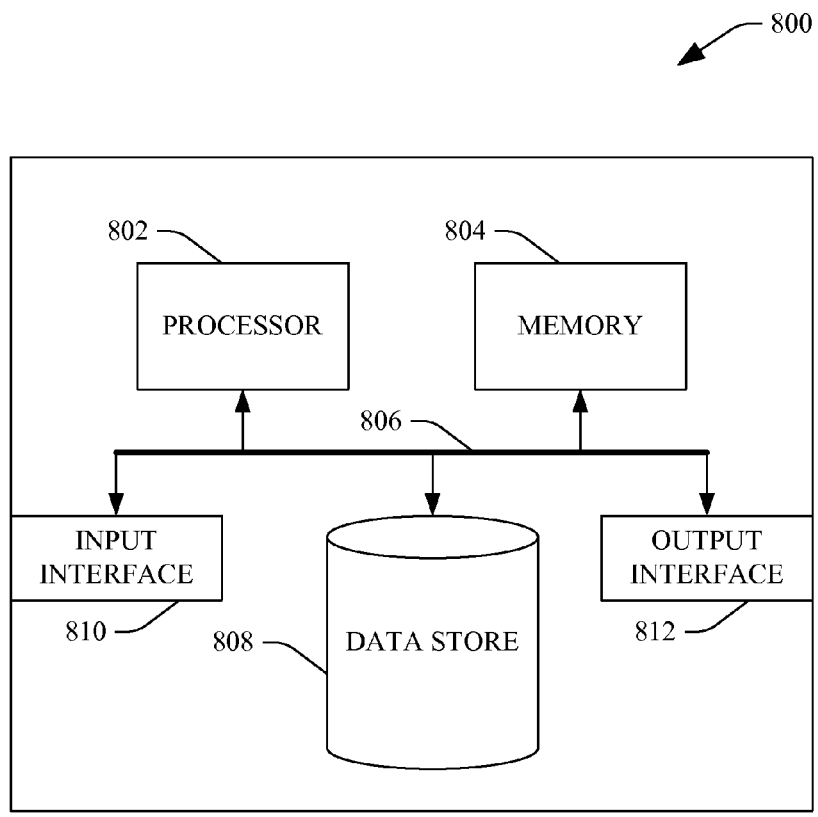
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports high performance computing. In another example, at least a portion of the computing device 800 may be used in a system that supports pipelined matrix computation. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store matrix tiles, matrix blocks, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, matrix tiles, matrix blocks, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   receiving a computer-executable algorithm that is configured to execute a matrix computation on a tile of a matrix;
   translating the computer-executable algorithm into a computer-implemented global directed acyclic graph that comprises a plurality of vertices and a corresponding plurality of edges, wherein a vertex in the global directed acyclic graph is configured to perform a sequence of operations on the tile of the matrix and the plurality of edges represent data dependencies between coupled vertices, the translating performed by a computer processor; and
   representing the vertex in the global directed acyclic graph as a local directed acyclic graph that comprises a plurality of vertices, wherein a vertex in the local directed acyclic graph is configured to execute a mathematical operation on a matrix block that is smaller than the tile, wherein the vertex in the local directed acyclic graph executes the mathematical operation in a data-driven manner, the representing performed by the computer processor.

2. The method of claim 1, wherein executing the mathematical operation in the data driven manner comprises executing the mathematical operation on the block responsive to the block being received at the vertex in the local directed acyclic graph.

3. The method of claim 2, wherein executing the mathematical operation in the data driven manner comprises outputting another block for provision to another vertex in the local directed acyclic graph immediately subsequent to executing the mathematical operation on the block.

4. The method of claim 1, wherein size of the block corresponds to size of a cache of a computing device that comprises the local directed acyclic graph.

5. The method of claim 1, wherein the local directed acyclic graph is represented as skeleton code that causes an operator to fire responsive to receipt of the block.

6. The method of claim 1, further comprising scheduling a plurality of different computing devices to perform a plurality of different matrix computations to generate an output.

7. The method of claim 1, further comprising:
   detecting a failure with respect to the local directed acyclic graph; and
   causing the mathematical operation to be re-executed responsive to detecting the failure.

8. The method of claim 7, further comprising:
   recording identities of blocks output by the vertex in the local directed acyclic graph; and
   causing the mathematical operation to be re-executed based at least in part upon the identities of the blocks output by the vertex.

9. The method of claim 8, further comprising:
   prior to causing the mathematical operation to be re-executed, querying children vertices in the local directed acyclic graph for identities of blocks needed by the children vertices; and
   causing the mathematical operation to be re-executed based at least in part upon identities of the block returned responsive to the querying.

10. The method of claim 1 configured for execution in a high performance computing environment.

11. The method of claim 1, wherein output of the global directed acyclic graph is configured for employment in connection with one of facial recognition and three-dimensional modeling.

12. A system that facilitates large-scale distributed matrix computation, the system comprising:
   a processor; and
   a memory that comprises a plurality of components that are executed by the processor, the plurality of components comprising:
   a scheduler component that receives a computation pertaining to a matrix and performs the following actions:

causes the computation to be represented as a plurality of vertices that are representative of computations to be undertaken by tiles of the matrix, the plurality of vertices being related by a plurality of edges; and schedules the plurality of vertices to be executed on a corresponding plurality of computing devices; and an executor component that executes the computations in parallel in a data-driven manner.

13. The system of claim 12, wherein the scheduler component causes the computation to be represented as a global directed acyclic graph.

14. The system of claim 13, wherein the scheduler component is further configured, for a vertex in the global directed acyclic graph, cause a matrix computation corresponding to the vertex to be represented as a plurality of child vertices that are configured to execute matrix computations on blocks, wherein the blocks are of a size that is less than the tiles.

15. The system of claim 14, wherein the blocks are the respective sizes of caches of the plurality of computing devices.

16. The system of claim 12, wherein the executor component retrieves at least one matrix computation from a library responsive to computer-executable code represented by a vertex calling the at least one matrix computation from the library.

17. The system of claim 12 being distributed across the plurality of computing devices.

18. The system of claim 12, further comprising a fault detector component that detects that a fault has occurred on at least one computing device and causes the executor component to re-execute at least one computation responsive to detecting that the fault has occurred.

19. The system of claim 18, wherein the fault detector component causes the at least one computation to be re-executed based at least in part upon data retained with respect to child vertices that are dependent upon data from a vertex that represents the at least one computation.

20. A computer-readable medium comprising instructions that, when executed by a processor, cause the processor to perform acts, comprising:

receiving at least one computation that is to be executed over a matrix;

subsequent to receiving the at least one computation, representing the at least one computation as a sequence of operations that are to be undertaken on tiles of the matrix;

subsequent to representing the at least one computation as the sequence of operations, translating at least one operation into a global directed acyclic graph that comprises a plurality of vertices that are configured to perform a corresponding plurality of sequential operations on at least one tile of the matrix and a plurality of edges that represent data dependencies between the plurality of vertices;

subsequent to translating the at least one operation in the global directed acyclic graph, representing at least one vertex in the global directed acyclic graph as a local directed acyclic graph that comprises a plurality of vertices that are configured to perform a corresponding plurality of sequential operations on at least one block that corresponds to the matrix, wherein a size of the block is smaller than a size of the at least one tile; and causing the sequential operations that are represented by the plurality of vertices in the local directed acyclic graph to be executed in a data-driven manner.

* * * * *